(12) United States Patent
Haider et al.

(10) Patent No.: US 8,134,022 B2
(45) Date of Patent: Mar. 13, 2012

(54) POLYETHER CARBONATE POLYOLS MADE VIA DOUBLE METAL CYANIDE (DMC) CATALYSIS

(75) Inventors: Karl W. Haider, Wexford, PA (US); Kenneth G. McDaniel, Sr., Charleston, WV (US); John E. Hayes, Gibsonia, PA (US); Jianzhong Shen, Audubon, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 12/880,231

(22) Filed: Sep. 13, 2010

(65) Prior Publication Data

US 2010/0331517 A1    Dec. 30, 2010

Related U.S. Application Data

(62) Division of application No. 11/491,680, filed on Jul. 24, 2006.

(51) Int. Cl.
*C07C 69/96*     (2006.01)
*C08G 64/02*     (2006.01)
*C08G 64/32*     (2006.01)

(52) U.S. Cl. ........ 558/265; 558/266; 528/370; 528/403; 528/410; 528/414

(58) Field of Classification Search ................ 528/370, 528/403, 410, 414; 558/265, 266
See application file for complete search history.

(56) References Cited

U.S. PATENT DOCUMENTS

| | | |
|---|---|---|
| 4,500,704 A | 2/1985 | Kruper, Jr. et al. |
| 4,826,953 A | 5/1989 | Kuyper et al. |
| 5,470,813 A * | 11/1995 | Le-Khac .............. 502/175 |
| 5,482,908 A | 1/1996 | Le-Khac |
| 5,641,858 A * | 6/1997 | Le-Khac .............. 528/405 |
| 5,731,407 A * | 3/1998 | Le-Khac .............. 528/409 |
| 5,783,513 A | 7/1998 | Combs et al. |
| 6,713,599 B1 | 3/2004 | Hinz et al. |
| 6,762,278 B2 | 7/2004 | Hinz et al. |

FOREIGN PATENT DOCUMENTS

| | | |
|---|---|---|
| WO | 03/029240 A1 | 4/2003 |
| WO | 2006/103214 A1 | 10/2006 |

OTHER PUBLICATIONS

Chen et al. Polymer 2004, 45(19), 1-6.*
Polymer, 45 (19) (month Unavailable) 2004, p. 6519-6524, Shang Chen et al, "Copolymerization of carbon dioxide and prpylene oxide with highly effective zin hexacyanocobaltate (iii)-based coordination catalyst".
Journal of Catalysis 105, (month unavailable) 1987, pp. 163-173, J. Kuyper et al, "Hexacyanometallate Salts Used as Alkene-Oxide Polymerization Catalysts and Molecular Sieves".

* cited by examiner

*Primary Examiner* — Jason M Nolan
(74) *Attorney, Agent, or Firm* — N. Denise Brown; Noland J. Cheung

(57) ABSTRACT

The present invention relates to a polyether carbonate polyol made by copolymerizing a starter molecule with carbon dioxide, at a pressure ranging from about 10 psia to about 2,000 psia, and an alkylene oxide, at a temperature ranging from about 50° C. to about 190° C. and in the presence of from about 0.001 wt. % to about 0.2 wt. % of a substantially non-crystalline double metal cyanide (DMC) catalyst, wherein the polyol has an incorporated carbon dioxide content of from about 1 wt. % to about 40 wt. %, wherein the ratio of cyclic carbonate by-product to total carbonate is less than about 0.3 and wherein the weight percentages are based on the weight of the polyol. The inventive polyether carbonate polyols may find use in producing polyurethane foams, elastomers, coatings, sealants and adhesives with improved properties.

14 Claims, No Drawings

POLYETHER CARBONATE POLYOLS MADE VIA DOUBLE METAL CYANIDE (DMC) CATALYSIS

CROSS-REFERENCE TO RELATED APPLICATIONS

The present application is a divisional application of copending U.S. application Ser. No. 11/491,680, filed on Jul. 24, 2006.

FIELD OF THE INVENTION

The present invention relates in general to polyurethane producing components and more specifically to polyether carbonate polyols which are made from an alkylene oxide and carbon dioxide in the presence of a double metal cyanide (DMC) catalyst.

BACKGROUND OF THE INVENTION

The formation of propylene oxide-carbon dioxide (PO—$CO_2$) copolymers has been widely investigated with a number of catalysts being evaluated for the production of these materials. The major thrust of the work to date has been to provide a method to convert a greenhouse gas into a useful product. The success of these studies has been limited because a majority of the catalysts require relatively long reaction times and high catalyst loadings. Double metal cyanide catalysts show the greatest potential because of the high yields and relatively fast rates of reaction that are characteristic of such catalysts. A disadvantage of using the DMC catalysts is the production of mixed polyether polycarbonates instead of alternating monomers of pure polycarbonates. Another disadvantage is that DMC catalysts also produce significant amounts of by-product cyclic alkylene carbonates (according to the following equation).

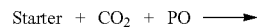
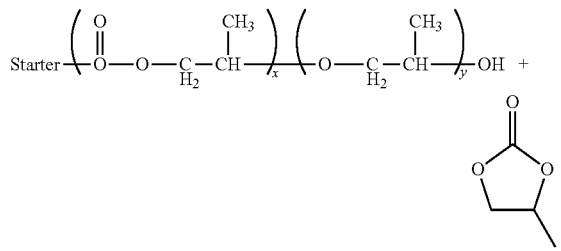

This formation of smaller amounts of by-product alkylene carbonate has been shown in several patents and publications. The amount of cyclic carbonate is not given in some of those patents, so it is necessary to make some assumptions based on the similarity of catalysts for which data is reported.

For example, Kuyper et al., in U.S. Pat. No. 4,826,953, disclose the use of DMC catalysts for the production of polyether polycarbonates using complexes based on zinc hexacyanocobaltates with glyme as the ligand. In the '953 patent, Kuyper et al. did not list the amount of cyclic carbonate produced, but based on the data from Table 1 of the '953 patent, the calculated amounts of cyclic carbonate appear to range from about 13% to about 31% (see table below).

| Data Based on Table 1 of U.S. Pat. No. 4,826,953* | | | | |
|---|---|---|---|---|
| Run | Product | Polyol | Cyclic carbonate | Cyclic carbonate (%) |
| 1 | 1627.8 | 1419.4 | 208.4 | 13 |
| 2 | 1694.2 | 1352 | 342.2 | 20 |
| 3 | 1781.5 | 1234.6 | 546.9 | 31 |
| 4 | 1732.8 | 1297.9 | 434.9 | 25 |
| 5 | 1782.9 | 1260.5 | 522.4 | 29 |
| 6 | 1772.3 | 1345.2 | 427.1 | 24 |
| 7 | 1777.3 | 1317.1 | 460.2 | 26 |

*Assumes that propylene carbonate formed is the difference between product yield and polyol yield as discussed therein at col. 6, line 62.

The formation of the cyclic carbonates reduces yields and may increase process costs due to the loss of raw material and the increased processing efforts necessary to remove the cyclic alkyl carbonates. As those skilled in the art are aware, if the cyclic carbonates are allowed to remain in the product and the linear carbonate is converted to polyurethane, the cyclic carbonates act as plasticizers and modify product properties. The catalysts used in the '953 patent were based on zinc hexacyanocobaltate complexed with glyme and these catalysts were used in conjunction with various salts such as zinc sulfate to increase catalyst reactivity. These catalysts have crystalline structures (See, Kuyper and Boxhom, *Journal of Catalysis*, 105, pp 163-174 (1987)).

U.S. Pat. No. 4,500,704 issued to Kruper, Jr., et al., teaches the use of DMC catalysts to produce polymers based on alkylene oxides and carbon dioxide as given in the table below. The amounts of cyclic, carbonates vary from 12% to 64% except for cis-cyclohexene oxide which forms no cyclic carbonate. The lack of formation of the cyclic carbonate from the reaction of cis-cyclohexene oxide and carbon dioxide may be related to steric factors in the formation of this bicyclic product and is not believed to be reflective of the products obtained with other alkylene oxides. The catalysts used in the '704 patent are glyme-zinc hexacyanocobaltate complexes which are known to those skilled in the art to have crystalline structures.

| Data taken from U.S. Pat. No. 4,500,704 (See Table 1) | | | | | | |
|---|---|---|---|---|---|---|
| Ex | Oxirane | Rxn. Temp. (° C.) | Rxn. Time (Hr) | Conversion (%) | Copolymer (%) | Cyclic carbonate (%) | Polyether (%) |
| 2 | propylene oxide | 35 | 48 | 71 | 76 | 18 | 6 |
| 3 | ethylene oxide | 30 | 84 | 31 | 50 | 40 | 10 |
| 4 | 1-butylene oxide | 35 | 48 | 38 | 71 | 17 | 12 |
| 5 | propylene oxide | 25 | 84 | 65 | 85 | 12 | 3 |
| 6 | propylene oxide | 40 | 48 | 64 | 66 | 26 | 8 |
| 7 | propylene oxide | 80 | 24 | 55 | 0 | 64 | 36 |

-continued

Data taken from U.S. Pat. No. 4,500,704 (See Table 1)

| Ex | Oxirane | Rxn. Temp. (° C.) | Rxn. Time (Hr) | Conversion (%) | Copolymer (%) | Cyclic carbonate (%) | Polyether (%) |
|---|---|---|---|---|---|---|---|
| 8 | cis-cyclohexene oxide | 90 | 24 | 30 | 100 | 0 | 0 |

Hinz et al., in U.S. Pat. No. 6,762,278, teach the use of crystalline DMC catalysts having platelet-shaped structures which account for more than 30% of the particles. The improvement of Hinz et al. lies in the resulting polyether polycarbonates having narrower polydispersities than are obtained with other catalysts even where t-butyl alcohol (TBA) is used as a catalyst ligand. As can be appreciated by reference to the table below, the comparative catalysts in the '278 patent show polydispersities greater than 2.37. The polyether polycarbonates of the inventive examples of the Hinz et al. '278 patent have polydispersities less than 1.8. The formation of propylene carbonate is discussed in some of the examples of the '278 patent; however, the amounts are not given.

Data taken from U.S. Pat. No. 6,762,278*

| Comparative examples | Polydispersity | Inventive examples | Polydispersity |
|---|---|---|---|
| 1 | 2.99 | 1 | 1.63 |
| 2 | 2.53 | 2 | 1.69 |
| 3 | 3.85 | 3 | 1.73 |
| 4 | 2.37 | 4 | 1.62 |
| 5 | 3.36 | 5 | 1.16 |
| 6 | 5.52 | 6 | 1.26 |
|   |      | 7 | 1.39 |
|   |      | 8 | 1.46 |
|   |      | 9 | 1.58 |

*Data from examples 1-9.

S. Chen et al. report the use of several DMC catalysts to prepare polyether polycarbonates, and they find cyclic carbonate contents ranging from about 13% to about 17% (See, Table 4 of S Chen et. al, *J. Polymer*, 45(19) 6519-6524, (2004)). The amounts of propylene carbonate agree with the ranges reported in U.S. Pat. Nos. 4,500,704 and 4,826,953. Although the authors do not report whether the catalysts that they used had crystalline or amorphous structures, the glyme-modified (1,2-dimethoxyethane) is generally accepted by those in the art to have a crystalline structure and all of the catalysts used in Chen's study gave cyclic carbonates in the same range.

Data taken from S. Chen et. al*

| Complexing agent | Cyclic carbonate (%) |
|---|---|
| 1,2 Dimethoxyethane | 13.1 |
| 2-Methoxy Ethanol | 12.5 |
| 1-Methoxy-2-Propanol | 14.6 |
| THF | 16.2 |
| PPG 1000 | 15.6 |
| t-Butanol | 14.2 |
| None | 16.5 |

*Data from Table 3 of S. Chen et al. See Table 1 of Chen et al. for additional data.

U.S. Pat. No. 6,713,599, issued to Hinz et al., teaches the addition of a sterically hindered chain transfer agent capable of protonating the polyol to reduce the amount of high molecular weight tail in a DMC catalyzed polyol production process. The invention of the Hinz et al. '599 patent also appears to improve the polydispersity.

Data taken from U.S. Pat No. 6,713,599

| Example | Polydispersity | Additive |
|---|---|---|
| 1 | 1.31 | TBA |
| 2 | 1.36 | TBA |
| 3 | 1.41 | 2,4,6-tri-t-butyl phenol |
| 4 | 1.39 | phenol |
| 5 | 1.47 | catechol |
| 6 | 1.54 | di-t-butylbenzoic acid |
| Comparative 1 | 1.73 | none |
| Comparative 2 | 1.99 | dipropylene glycol |
| Comparative 3* | 1.12 | difluorophenol |
| Comparative 4* | 1.11 | water |
| Compatative 5 | 2.12 | Low Catalyst |
| Comparative 6 | 1.59 | Poor catalyst |

*Run Deactivated

However, a disadvantage of the Hinz et al. '599 patent lies in the necessity of adding a monofunctional initiator. As known to those skilled in the art, monofunctional materials cause deterioration in polymer properties when those materials are converted to polyurethanes.

Therefore, a need continues to exist in the art for polyether carbonate polyols containing a lower level of cyclic carbonate by-products than is achievable by the methods currently known in the art.

SUMMARY OF THE INVENTION

Accordingly, the present invention relates to a polyether carbonate polyol made by copolymerizing a starter molecule with carbon dioxide, at a pressure ranging from about 10 psia to about 2,000 psia, and an alkylene oxide, at a temperature ranging from about 50° C. to about 190° C. and in the presence of from about 0.001 wt. % to about 0.2 wt. % of a substantially non-crystalline double metal cyanide (DMC) catalyst, wherein the polyol has an incorporated carbon dioxide content of from about 1 wt. % to about 40 wt. %, wherein the ratio of cyclic carbonate by-product to total carbonate is less than about 0.3 and wherein the weight percentages are based on the weight of the polyol. Because of the lowered level of cyclic carbonates, the inventive polyether carbonate polyols may find use in producing polyurethane foams, elastomers, coatings, sealants and adhesives with improved properties, such as carbon dioxide blowing agent compatibility and fire resistance.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides a polyether carbonate polyol produced by copolymerizing a starter molecule with carbon dioxide, at a pressure ranging from 10 psia to 2,000 psia, and an alkylene oxide, at a temperature ranging from 50° C. to 190° C. and in the presence of from 0.001 wt. % to 0.2 wt. % of a substantially non-crystalline double metal cyanide (DMC) catalyst, wherein the polyol has an incorporated carbon dioxide content of from 1 wt. % to 40 wt. %, wherein the ratio of cyclic carbonate by-product to total carbonate is less than 0.3 and wherein the weight percentages are based on the weight of the polyol.

The present invention further provides a process for producing a polyether carbonate polyol involving copolymerizing a starter molecule with carbon dioxide, at a pressure ranging from 10 psia to 2,000 psia, and an alkylene oxide, at a temperature, ranging from 50° C. to 190° C. and in the presence of from 0.001 wt % to 0.2 wt. % of a substantially non-crystalline double metal cyanide (DMC) catalyst, wherein the polyol has an incorporated carbon dioxide content of from 1 wt. % to 40 wt %, wherein the ratio of cyclic carbonate by-product to total carbonate is less-than 0.3 and wherein the weight percentages are based on the weight of the polyol.

The present inventors have discovered that using a substantially non-crystalline double metal cyanide catalyst and controlling carbon dioxide pressure and reaction temperature allows the production of polyether carbonate polyols having incorporation of carbon dioxide with very low levels of cyclic carbonate by-products. The polyether carbonate. polyols of the present invention preferably have a carbon dioxide incorporation of from 1 wt. % to 40 wt. %, more preferably from 1 wt % to 20 wt. %, based on the weight of the polyol. Thus, the inventive polyether carbonate polyols may provide enhanced carbon dioxide blowing agent compatibility and fire resistance in, polyurethane foams made with these polyols.

The carbon dioxide pressure in the inventive process ranges from 10 psia to 2,000 psia, more preferably from 40 psia to 150 psia. The reaction temperature in the inventive process may vary from 50° C. to 190° C., more preferably from 60° C. to 140° C.

Preferred double metal cyanide (DMC) catalysts are those which exhibit a substantially non-crystalline character (substantially amorphous) such as disclosed in U.S. Pat. Nos. 5,482,908 and 5,783,513, the entire contents of which are incorporated herein by reference thereto. These catalysts show significant improvements over the previously studied catalysts because the amounts of by-product cyclic carbonates are low. Thus, there is a clear advantage to using substantially non-crystalline DMC catalysts for the production of these polycarbonates, because of the lower amounts of propylene carbonate produced than the catalysts' and processes in U.S. Pat. Nos. 4,500,704 and 4,826,953.

The catalysts disclosed in U.S. Pat. Nos. 5,482,908 and 5,783,513 differ from other DMC catalysts because these catalysts exhibit a substantially non-crystalline morphology. In addition, these catalysts are based on a combination of ligands such as t-butyl alcohol and a polydentate ligand (polypropylene oxide polyol). It appears that the polydispersity of the inventive polycarbonates is related to the amount of carbon dioxide in the polymer, with the polydispersity increasing with the amount of carbon dioxide in the polymer.

The DMC, catalyst concentration in the inventive process is chosen to ensure a good control of the polyoxyalkylation reaction under the given reaction conditions. The catalyst concentration is preferably in the range from 0.001 wt. % to 0.2 wt. %, more preferably in the range from 0.0024 wt. % to 0.1 wt. %, most preferably in the range from 0.0025 to 0.06 wt. %, based on the weight of the polyol produced. The substantially non-crystalline DMC catalyst may be present in an amount ranging between any combination of these values, inclusive of the recited values.

Suitable starter or initiator compounds include, but are not limited to, $C_1$-$C_{30}$ monols, ethylene glycol, diethylene glycol, triethylene glycol, propylene glycol, dipropylene glycol, tripropylene glycol, neopentyl glycol, 1,3 propanediol, 1,4 butanediol, 1,2 butanediol, 1,3 butanediol, 2,3 butanediol, 1,6 hexanediol, water, glycerin, trimethylolpropane, trimethylolethane, pentaerythritol, $\alpha$-methylglucoside, sorbitol, mannitol, hydroxymethylglucoside, hydroxypropylglucoside, sucrose, 1,4-cyclohexanediol, cyclohexanedimethanol, hydroquinone, resorcinol and the like. Mixtures of monomeric initiators or their oxyalkylated oligomers may also be utilized. Preferred initiator compounds are the oxyalkylated oligomers of ethylene glycol, propylene glycol, glycerin or trimethylolpropane.

The starter in the instant invention may be charged to the reactor prior to the addition of alkylene oxide, or added continuously during the oxyalkylation in the continuous addition of starter process as described in U.S. Pat. No. 5,777,177, the entire contents of which are incorporated herein by reference thereto.

Alkylene oxides useful in the present invention include, but are not limited to, ethylene oxide, propylene oxide, 1,2- and 2,3-butylene oxide, isobutylene oxide, epichlorohydrin, cyclohexene oxide, styrene oxide, and the higher alkylene oxides such as the $C_5$-$C_{30}$ $\alpha$-alkylene oxides. Propylene oxide alone or mixtures of propylene oxide with ethylene oxide, most preferably at a ratio of 90:10, are particularly preferred for use in the present invention. Other alkylene oxides mixed with propylene oxide may also prove useful in the inventive processes.

Other polymerizable monomers may be used as well, e.g. polycarboxylic anhydrides (phthalic anhydride, trimellitic anhydride, pyromellitic anhydride, methylendomethylene tetrahydrophthalic anhydride, endomethylene tetrahydrophthalic anhydride, chlorendic, anhydride and maleic anhydride) lactones and other monomers as disclosed in U.S. Pat. Nos. 3,404,109; 5,145,883; and 3,538,043.

The inventive polyether carbonate polyols may be reacted with one or more polyisocyanates to produce polyurethane foams, elastomers, coatings, sealants and adhesives, as known to those skilled in the art.

EXAMPLES

The present invention is further illustrated, but is not to be limited, by the following examples. In the examples below, polyether carbonate polyols were typically made as follows: a glycerine-initiated polyoxypropylated triol of nominal 700 Da molecular weight (350 g) and the amount of substantially non-crystalline DMC catalyst, made according to U.S. Pat. No. 5,482,908 listed below in the tables were charged to a polyol reactor. The mixture was heated to 130° C. and vacuum stripped with nitrogen for 20 minutes. Immediately before the reaction started, the pressure was reduced to 0.1 psi and 53 g of propylene oxide (PO) was added to activate the catalyst. After the pressure reached one-half of the initial pressure, the reactor temperature was set as given below in the tables (90 to 150° C.) and carbon dioxide was fed into the reactor using a pressure regulator. Propylene oxide (1098 g) was fed over the time given below in the tables. At the end of the PO feed, the reaction mixture was allowed to "cookout" for 20 minutes. The reaction product was drained from the reactor following nitrogen purge and vacuum Examples C1 to 6

As can be appreciated by reference to Table I below, the viscosity values for the 3,000 Da triols are comparable with the all PO triol Made in example C1. However, where significant amounts of $CO_2$ are added to the polyol, the viscosity tends to be increases. Because $CO_2$ can reduce the activity of the DMC catalysts, more catalyst is needed to maintain the same activity.

Examples 7 to 19

Table II below demonstrates the effects of temperature, catalyst amount and carbon dioxide pressure on carbon dioxide incorporation into polyethers.

TABLE I

| Table I Ex. No. | Catalyst (ppm) | $CO_2$ (psia) | Reaction Temp. (° C.) | PO feed time (hrs) | Unsaturation | HMW tail (100k) | OH # | Viscosity (cSt) | PDI |
|---|---|---|---|---|---|---|---|---|---|
| C1 | 50 | 80 | 100 | 3 | 0.0033 | 6003 | 55.2 | 3406 | 2.25 |
| 2 | 50 | 50 | 130 | 3 | 0.0047 | 161 | 57 | 621 | 1.11 |
| 3 | 50 | 80 | 130 | 3 | 0.0048 | 140 | 56.8 | 685 | 1.12 |
| 4 | 50 | 120 | 130 | 3 | 0.0048 | 152 | 55.6 | 766 | 1.17 |
| 5 | 100 | 80 | 100 | 3 | 0.0039 | 282 | 53.5 | 1190 | 1.26 |
| 6 | 100 | 80 | 100 | 6 | 0.0036 | 153 | 54 | 1071 | 1.18 |

TABLE II

| Ex. No. | Reaction temp. (° C.) | $CO_2$ (psia) | Catalyst (ppm) | RPM | PO feed time (hrs) | Linear carbonate (%) | Cyclic carbonate (%) | Cyclic Carbonate/ Total (%) | OH # | Viscosity (cSt) | PDI |
|---|---|---|---|---|---|---|---|---|---|---|---|
| 7 | 90 | 40 | 30 | 200 | 6 | 2.35 | 0.00 | 0.0 | 55.5 | 816 | 1.18 |
| 8 | 90 | 40 | 30 | 600 | 2 | 2.96 | 0.07 | 2.3 | 55.7 | 1034 | 1.49 |
| 9 | 90 | 40 | 200 | 200 | 2 | 1.23 | 0.00 | 0.0 | 55.8 | 706 | 1.13 |
| 10 | 90 | 40 | 200 | 600 | 6 | 4.23 | 0.65 | 13.3 | 55.7 | 732 | |
| 11 | 100 | 80 | 100 | 600 | 6 | 9.34 | 1.52 | 14.0 | 53.2 | 1068 | 1.06 |
| 12 | 100 | 100 | 100 | 600 | 5 | 15.40 | 2.11 | 12.05 | 45.8 | 4268 | |
| 13 | 120 | 70 | 100 | 400 | 3 | 3.76 | 1.20 | 24.2 | 55.9 | 671 | 1.04 |
| 14 | 130 | 40 | 200 | 600 | 6 | 5.69 | 0.91 | 13.8 | 52.8 | 840 | 1.03 |
| 15 | 130 | 70 | 100 | 400 | 3 | 1.87 | 0.20 | 9.7 | 55.5 | 672 | 1.15 |
| 16 | 130 | 70 | 100 | 400 | 3.5 | 1.60 | 0.19 | 10.6 | 55.8 | 605 | 1.09 |
| 17 | 150 | 40 | 30 | 200 | 2 | 0.52 | 0.00 | 0.0 | 57.1 | 811 | 1.33 |
| 18 | 150 | 40 | 200 | 600 | 2 | 0.28 | 0.30 | 51.7 | 57.9 | 538 | 1.02 |
| 19 | 150 | 50 | 30 | 200 | 1 | 0.24 | 0.00 | 0.0 | 57.9 | 595 | 1.1 |

Examples 20 to 22

The effect of mixing speed was examined and the results summarized in Table III below. Surprisingly, the amount acyclic carbonate remains low even at the higher levels of linear carbonate incorporation into the polyol.

Examples; 23 to C26

The effect of DMC catalyst type was examined. Table IV below gives the amounts of cyclic carbonate formed using three different catalysts. Examples 23, 24 and 25 used non-crystalline catalysts made according to U.S. Pat. No. 5,482,908 and Example C26 (glyme) used a crystalline catalyst. Example 23 employed a DMC catalyst modified with TBA and cholic acid.

TABLE III

| Ex. No. | RPM | $CO_2$ (psia) | Reaction Temp. (° C.) | Catalyst (ppm) | PO feed time (hrs) | Linear carbonate (%) | Cyclic carbonate (%) | Cyclic carbonate/Total (%) | OH # | Viscosity (cSt) | PDI |
|---|---|---|---|---|---|---|---|---|---|---|---|
| 20 | 600 | 120 | 90 | 200 | 2 | 16.81 | 1.88 | 10.1 | 51 | 2381 | 1.31 |
| 21 | 600 | 120 | 90 | 200 | 2 | 17.26 | 1.84 | 9.6 | 50.9 | 2531 | 1.24 |
| 22 | 1200 | 120 | 90 | 200 | 2 | 16.06 | 1.55 | 8.9 | 49 | 2499 | 1.36 |

TABLE IV

| Ex. No. | Catalyst morphology | Catalyst (ppm) | $CO_2$ (psia) | Reaction Temp. (°C.) | Linear carbonate (%) | Cyclic carbonate (%) | Cyclic Carbonate/Total (%) | OH # | PDI |
|---|---|---|---|---|---|---|---|---|---|
| 23 | Substantially non-crystalline | 200 | 120 | 90 | 16.8 | 2.2 | 11.6 | 50.3 | 1.6 |
| 24 | Substantially non-crystalline | 200 | 120 | 90 | 17.3 | 1.8 | 9.4 | 50.9 | 1.2 |
| 25 | Substantially non-crystalline | 200 | 120 | 90 | 16.8 | 1.9 | 10.1 | 51 | 1.3 |
| C26 | Glyme | 500 | 120 | 90 | 7.8 | 6.6 | 45.8 | 54.9 | |

The foregoing examples of the present invention are offered for the purpose of illustration and not limitation. It will be apparent to those skilled in the art that the embodiments described herein may be modified, or revised in various ways without departing from the spirit and scope of the invention. The scope of the invention is to be measured by the appended claims.

What is claimed:

1. A process for producing a polyether carbonate polyol comprising:
   copolymerizing a starter molecule with carbon dioxide, at a pressure ranging from about 10 psia to about 2,000 psia, and an alkylene oxide, at a temperature ranging from about 50° C. to about 190° C., in the presence of from about 0.001 wt. % to about 0.2 wt. % of a substantially non-crystalline double metal cyanide (DMC) catalyst, wherein the resultant polyether carbonate polyol has an incorporated carbon dioxide content of from about 1 wt. % to about 40 wt. %, wherein the ratio of cyclic carbonate by-product to total carbonate is less than about 0.3 and wherein the weight percentages are based on the weight of the polyol.

2. The process according to claim 1, wherein the starter molecule is chosen from $C_1$-$C_{30}$ monols, ethylene glycol, diethylene glycol, triethylene glycol, propylene glycol, dipropylene glycol, tripropylene glycol, neopentyl glycol, 1,3 propanediol, 1,4 butanediol, 1,2 butanediol, 1,3 butanediol, 2,3 butanediol, 1,6 hexanediol, water, glycerin, trimethylolpropane, trimethylolethane, pentaerythritol, α-methylglucoside, sorbitol, mannitol, hydroxymethylglucoside, hydroxypropyiglucoside, sucrose, 1,4-cyclohexanediol, cyclohexanedimethanol, hydroquinone, resorcinol and alkoxylates thereof.

3. The process according to claim 1, wherein the starter molecule is chosen from alkoxylated oligomers of ethylene glycol, propylene glycol, glycerin and trimethylolpropane.

4. The process according to claim 1, wherein the starter molecule is added prior to the alkylene oxide.

5. The process according to claim 1, wherein the alkylene oxide is chosen from ethylene oxide, propylene oxide, 1,2-butylene oxide, 2,3-butylene oxide, isobutylene oxide, epichlorohydrin, cyclohexene oxide, styrene oxide, $C_5$-$C_{30}$ α-alkylene oxides, polycarboxylic anhydrides and lactones and mixtures thereof.

6. The process according to claim 1, wherein the alkylene oxide is propylene oxide.

7. The process according to claim 3, wherein the polyol has an incorporated carbon dioxide content of from about 1 wt. % to about 20 wt. %.

8. The process according to claim 1, wherein the ratio of cyclic carbonate by-product to total carbonate is less than about 0.15.

9. The process according to claim 1, wherein the substantially non-crystalline double metal cyanide (DMC) catalyst is a zinc hexacyanocobaltate.

10. The process according to claim 1, wherein the carbon dioxide pressure ranges from about 40 psia to about 150 psia.

11. The process according to claim 1, wherein the temperature ranges from about 60° C. to about 140° C.

12. The process according to claim 1, in which the process comprises adding an amount of a continuously added starter ($S_c$), and an amount of an initially charged starter ($S_i$), wherein the $S_c$ comprises at least 2 eq. % of the total starter used; and wherein the alkylene oxide and $S_c$ are continuously added to the reaction during copolymerization.

13. The process according to claim 12, wherein the alkylene oxide, carbon dioxide and $S_c$ are continuously added to the reaction during copolymerization.

14. The process of claim 1, wherein the starter molecule is added continuously during the copolymerization.

* * * * *